(No Model.)
W. H. HOLSCLAW.
WHEEL FOR SEED PLANTERS.
No. 468,136. Patented Feb. 2, 1892.
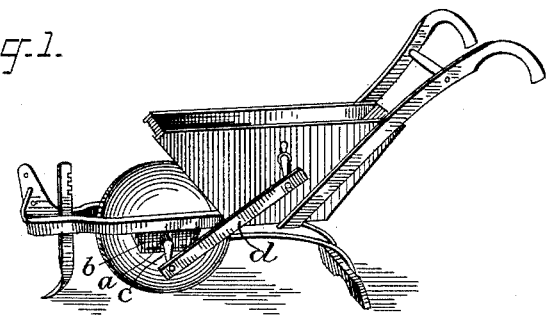
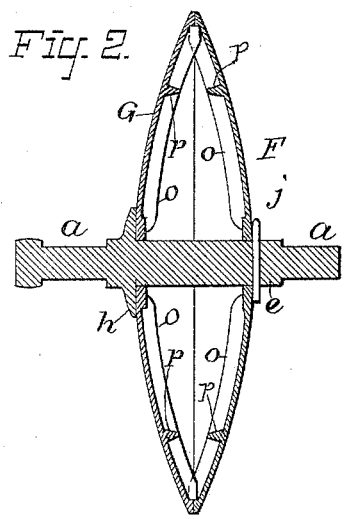
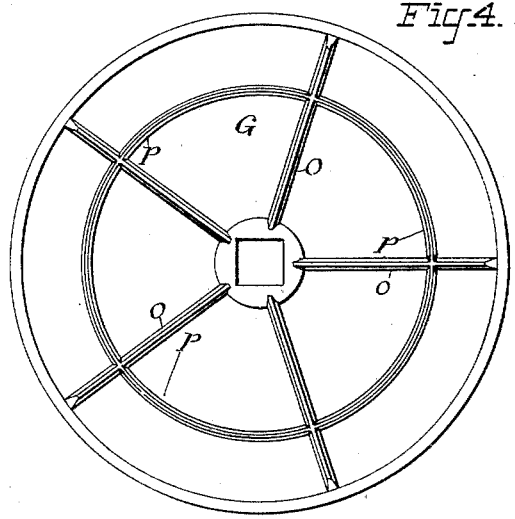
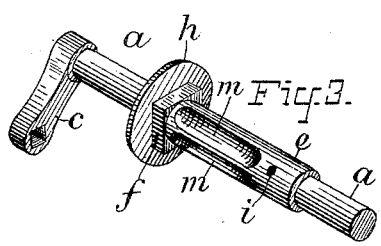
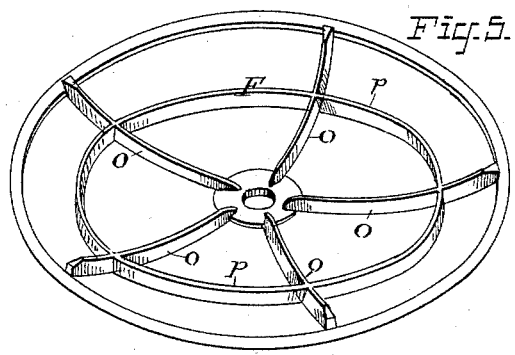
ATTEST:
J. A. Hurdle
M. E. Lofton
INVENTOR:
Wilford H. Holsclaw
By J. N. McIntire
Attorney

UNITED STATES PATENT OFFICE.

WILFORD H. HOLSCLAW, OF LOUISVILLE, KENTUCKY, ASSIGNOR TO B. F. AVERY & SONS, OF SAME PLACE.

WHEEL FOR SEED-PLANTERS.

SPECIFICATION forming part of Letters Patent No. 468,136, dated February 2, 1892.

Application filed November 25, 1891. Serial No. 413,067. (No model.)

*To all whom it may concern:*

Be it known that I, WILFORD H. HOLSCLAW, of Louisville, in the county of Jefferson and State of Kentucky, have invented a new and useful Improvement in Seed-Planters; and I do hereby declare that the following is a full, clear, and exact description of the same, reference being had to the accompanying drawings, forming part of this specification.

In cotton-seed planters and other analogous agricultural implements it is common to use a ground-wheel properly shaped to travel in the furrow or depression made by the opener, (which precedes the wheel,) the said wheel operating through the medium of its axle or spindle and suitable attachments as a driver to impart motion to the working or operative parts of the machine, and previous to my invention such wheels have been made usually of a solid piece of suitable wood, though they have sometimes been made, I believe, of metal. When made of wood, as is usual, these wheels are of course liable to warp and crack or split and are comparatively perishable, and all those which have been made of metal that I know of, while more durable than the solid wooden wheels, have been too cumbersome and too complex and expensive of manufacture to possess in the long run any practical and commercial advantage over the wooden ones.

My present invention has for its object to provide for general use a wheel device for cotton-planters and other analogous machines which, while composed of metal, and hence more durable than the wooden wheels now in general use, shall be comparatively light, simple in its construction, economic of manufacture, and exceedingly efficient in practical use.

To this main end and object my invention may be said to consist in a metallic two-part wheel, involving the novel structural features which will be found hereinafter more fully described, and which will be most particularly pointed out in the claims of this specification.

To enable those skilled in the art to understand and practice my invention, I will now proceed to more fully describe it, referring by letters to the accompanying drawings, which form part of this specification, and in which I have shown it carried out in that precise form in which I have so far successfully practiced it, though my said improvement may of course be practiced under various modifications or variations of form.

In the drawings I have shown at Figure 1 in perspective view a machine well known in the market as an "Avery's Harris-Dow-Law Cotton-Seed Planter," having applied to it a ground and drive wheel made according to my invention. Fig. 2 is a sectional elevation, on an enlarged scale, of the wheel and axle, seen in perspective at Fig. 1. Fig. 3 is a detail perspective view of the axle or arbor of the wheel detached from the wheel parts proper. Fig. 4 is a face view or elevation of one of the concavo-convex halves of the wheel, looking at its inner or concave side. Fig. 5 is a perspective view of the other half of the wheel, looking at its inner side.

In the several figures the same part will be found always designated by the same letter of reference.

In its application to a cotton-seed planter, such as exhibited at Fig. 1, the journals $a$ $a$ of the wheel's axle are mounted, of course, to turn freely in suitable boxes $b$, attached, as shown, to the frame of the planter, and said axle, with reference to its said journals $a$ $a$ and its crank $c$, with which one end of the usual pitman $d$ of the planter is connected, is made substantially like the metallic axle of the wooden ground-wheels heretofore used almost exclusively on the type of planter shown. As to its other portions, however, or with reference to the other parts, the axle is made quite differently from any heretofore used that I know of.

That portion of the axle which is intermediate of the journals $a$ $a$ comprises, as clearly shown at $e$, an enlarged cylindrical part and at $f$ a somewhat larger part still, which is square (or may be of other polygonal shape) in cross-section, and on these parts $e$ and $f$ are fitted and secured in place, as will be presently explained, respectively, the two dish-shaped castings or concavo-convex metallic devices F and G, which compose the wheel.

$h$ is a circular concentric flange or disk-like collar formed integrally with the axle and its polygonal device f, which collar h serves to back up or laterally support and hold in place in one direction the part G of the wheel, which at the interior surface of its perimeter contacts with and is forcibly held or supported in an opposite direction by the inner peripheral portion of the other wheel part F, this part F being forced home against the part G (where the perimeters of the two parts F and G meet) and there securely held by the cotter or split key j, that is driven into the diametrically-located hole i of the portion e of the axle, all as clearly illustrated in the drawings.

That portion of the axle which lies between the parts e and f is preferably cast with longitudinal depressions or flutes, as seen at m, in order to lighten up the axle or have it possess the requisite strength without any superfluous weight, and in making the parts F and G of cast metal, as shown, I cast said parts with strengthening-ribs or flange-like projections o p, arranged as shown, in order to get in these wheel parts the requisite strength with the least possible weight of metal. In lieu, however, of making these parts F and G of cast metal and of precisely the form shown they may be made, if found expedient to do so, of sheet metal. In either case, however, the part marked F must be provided with a central circular opening or eye for the accommodation of the cylindrical part e of the axle, while the part lettered G must have a square central aperture in it for the reception of the part f of said axle, and in assembling the parts shown the dish-shaped piece G is first slipped onto the shaft or axle, and, being passed over the part e thereof, is placed on the polygonal part f and up against the disk-like flange h. Then the part f is slipped onto the axle and adjusted thereon until its perimeter comes into contact with that of the part G, after which the cotter or key j is driven into the hole i to confine in place on the axle the assembled wheel parts. The part F being free to rotate or turn in the cylindrical portion e of the axle, said parts may be turned or adjusted until the best possible fit of the contacting perimeters of F and G shall have been attained to and thereupon the securement in place of the part F may be effected.

To assure the retention in place of the two parts F and G relatively, the hole i should be located so that after the perimeters of the said two parts shall have been brought into contact the driving into hole e of the key will operate to wedge or force home the part F against its mate G, (which is backed up by the collar h,) and thus, by reason of the spring of the assembled parts, (which will always possess some capacity to spring,) insure a perfect and very forcible contact of the perimeters of the two concavo-convex parts composing the wheel.

It will be observed that in the construction of the hollow two-part wheel shown and described, while the device as an entirety is light, strong, and efficient for the purposes for which it is designed, there are practically but three pieces involved in the whole structure—i. e., the metallic axle and the two concavo-convex parts F and G; that none of these parts have to be provided with any sort of screw-thread; that no bolt or nut is employed, and that the metallic parts need require but little machine-work to prepare them for proper assemblage. Of course the sizes and proportions of the parts may vary somewhat, according to the size of the wheel and the character of the machine on which it is to be used, and in carrying my invention into effect some other means than the key or cotter operating to drive home and hold in place relatively to the part G the wheel part F may be employed, though I prefer, for the sake of simplicity and economy of manufacture, the simple keying device shown.

Having now so fully described the construction of my improved metallic wheel device that those skilled in the art can make and use wheels embracing my invention, either in the precise form shown or under some modified form, what I claim as new, and desire to secure by Letters Patent, is—

1. In combination with an axle or arbor having the supporting flange-like device or portion h and the polygonally-shaped portion f, a concavo-convex metallic wheel part G, having a central aperture which fits to the part f of said axle, a concavo-convex wheel part F, arranged on said axle with its perimeter in contact with that of the part G, and means for clamping or holding together the parts F and G, all substantially as set forth.

2. In a two-part metallic wheel, the combination, with an axle formed or provided with the polygonal and cylindrical portions f and e, of the two dish-shaped wheel parts F and G, one having a polygonally-shaped central aperture and the other a circular one, and means for clamping the two parts F and G in forcible contact, all substantially as set forth.

3. The combination of the axle formed with the integral parts h and f and having the cylindrical portion e, a dish-shaped wheel part G, fitting to the part f of the axle and supported laterally by the part h, a dish-shaped wheel part F, similar to G, except as to having a circular central aperture to fit the part e of the wheel-axle, and a key or cotter arranged in the shaft-hole i and operating when inserted therein to hold the parts F and G in forcible contact, as and for the purposes set forth.

In witness whereof I have hereunto set my hand this 12th day of November, 1891.

WILFORD H. HOLSCLAW.

In presence of—
ADOLPH G. RENAN,
A. J. ERICH.